Figure 1:
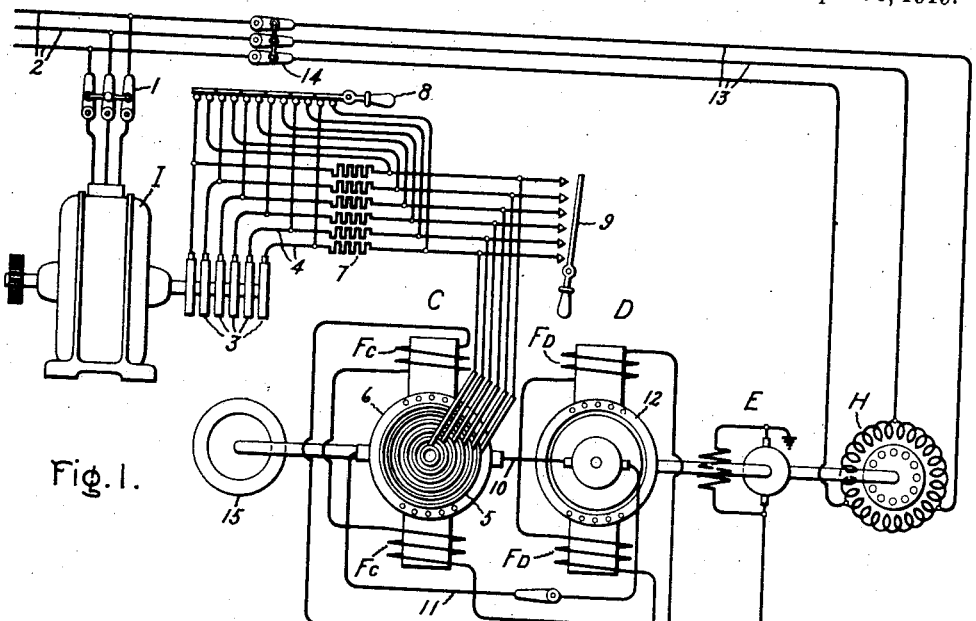

D. C. PRINCE.
SPEED CONTROL OF INDUCTION MOTORS.
APPLICATION FILED MAR. 17, 1917.

1,301,739.

Patented Apr. 22, 1919.

Inventor:
David C. Prince,
by
His Attorney.

UNITED STATES PATENT OFFICE.

DAVID C. PRINCE, OF SPRINGFIELD, ILLINOIS, ASSIGNOR TO GENERAL ELECTRIC COMPANY, A CORPORATION OF NEW YORK.

SPEED CONTROL OF INDUCTION-MOTORS.

1,301,739.  Specification of Letters Patent.  Patented Apr. 22, 1919.

Application filed March 17, 1917. Serial No. 155,453.

*To all whom it may concern:*

Be it known that I, DAVID C. PRINCE, a citizen of the United States, residing at Springfield, county of Sangamon, State of Illinois, have invented certain new and useful Improvements in Speed Control of Induction-Motors, of which the following is a specification.

My invention relates to the speed control of induction motors and more especially to the speed control of induction motors by means of rotary converters.

The purpose of my invention is to so construct and operate an induction motor speed control system, in which a rotary converter is electrically interposed between the induction motor secondary and a direct current dynamo-electric machine, that the speed of the induction motor can be varied through an extensive range including subsynchronous, synchronous and supersynchronous speeds, that its operation at each selected speed will be certain and stable for all motor loads within the limits for which the motor is designed, that the operation during the transition from one speed to another will be dependable regardless of the speeds between which the transition occurs, and that the speed variations throughout the entire range will be effected gradually, safely and with certainty.

The present invention will be more readily understood if reference be first made to the phenomena observed when it is attempted to carry the speed of an induction motor from a subsynchronous to a synchronous value by means of an ordinary rotary converter, the alternating current side of which is electrically connected to the phase wound induction motor secondary and the direct current side of which is connected to a direct current dynamo electric machine, the voltage of which may be changed both in amount and direction. With this arrangement if the induction motor be without load it is possible to raise the speed thereof through synchronism by decreasing the voltage, applied to the direct current end of the converter, to substantially zero, then reversing and increasing said voltage. This manipulation of the voltage causes the rotary to decelerate, reverse and accelerate and is accompanied by a tendency on the part of the induction motor to respond to the changes, effected in the circuits of the secondary thereof by the rotary, and hence to pass through synchronism. In the above described operation, however, even when the induction motor is without load, it usually happens that the converter requires several chances before it succeeds in dragging the induction motor through synchronism. In this operation it has been observed that the rotary will revolve slowly in the over-synchronous direction, while the speed of the induction motor increases, and then the converter will break out of step, make a quick fractional revolution and apparently catch on the next cycle, this process being repeated a time or two until the motor reaches a stable over-synchronous speed. When the induction motor is loaded to any considerable percentage of full load, it becomes wholly impossible to drag the induction motor through synchronism.

The principal cause of this instability at low induction motor slips is the sensitiveness of the converter to the phase angle displacement therein which results from the inductance of the direct current circuit in which the direct current side of the converter is included. If the said direct current circuit were perfectly non-inductive the conditions therein would instantly respond to the requirements of the induction motor and no large angle of phase displacement would occur in the rotary converter. Because of the inductance in said direct current circuit, however, there are periods of discrepancy between the input and the output of the converter which results in the acceleration of the converter and such a phase displacement therein that the set breaks down. I overcome these difficulties and attain the objects of my invention by reducing to the necessary extent the inductance of the direct current circuit and to this end I not only propose to design the cable layout to have minimum inductance, but also to provide said direct current dynamo-electric machine, or both said direct current dynamo-electric machine and rotary converter, with means to substantially reduce their inductance and hence the inductance of the direct current circuit in which they are included. These means, preferably, comprise windings arranged in inductive relation with the armatures so as to facilitate the changes in current therein. These windings may be short circuited or squirrel cage windings in which, upon a change in armature current, a current will be induced which will tend to prevent a change in flux due to the change in armature current, or they may be compensating windings connected in series with the armatures and adapted to develop an M. M. F. equal and opposite to the M. M. F. developed by the current in the armatures. Also in some instances it is desirable to modify the responsiveness of the converter to changes in torque by the use of a fly wheel, the inertia effect of which, together with that of the rotating element of the converter, functions to make the speed changes of the converter more gradual.

Figure 2:
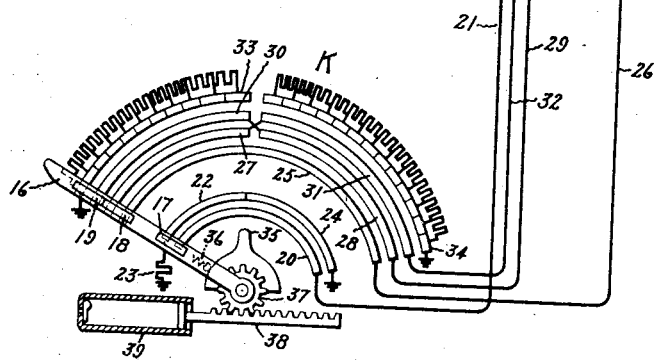
Figure 2:
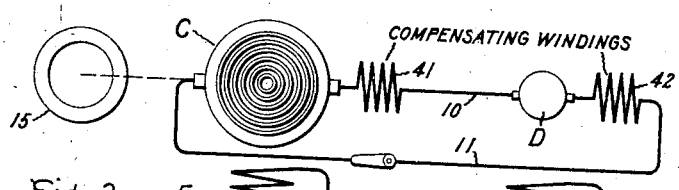

A better understanding of my invention may be had by referring to the accompanying drawings, in which: Figure 1 is a diagrammatic view illustrating an embodiment of my invention in which the field poles of the rotary converter and of the direct current dynamo-electric machine, electrically connected thereto, are provided with squirrel cage windings; and Fig. 2 is a partial diagrammatic view showing the rotary converter and the direct current dynamo-electric machine, electrically connected thereto, provided with series compensating windings, instead of squirrel cage windings.

Referring to Fig. 1, the induction motor I, whose speed it is the object of my invention to control, is connected by means of a three-pole switch 1 to the supply mains 2. The secondary of said motor is provided with slip rings 3 electrically connected by means of conductors 4 to the slip rings 5 of a rotary converter C, having a separately excited field winding $F_C$, and having field poles provided with a squirrel cage winding 6. In the conductors 4 are inserted starting resistances 7 adapted to be short circuited by the switch 8. The switch 9 may be provided for short circuiting the conductor 4 in case it be desired to operate the induction motor I with a short circuited secondary.

The direct current end of the rotary converter C is connected by means of conductors 10 and 11 to a direct current dynamo-electric machine D having a field winding $F_D$ and field poles provided with a squirrel cage winding 12. The armature of the dynamo-electric machine D is mounted upon a shaft which carries the armature of a direct current exciter E and the rotor of an alternating current machine H.

The dynamo-electric machine D during one period of its operation functions as a motor, being supplied with energy from the rotary converter C, to drive the alternating current machine H which delivers energy to the mains 2 through leads 13 and a three-pole switch 14. At another period of its operation the dynamo-electric machine D functions as a generator to supply energy to the rotary converter C being driven at this time by the alternating current machine H, operating as an induction motor and supplied with energy from supply mains 2 through the three-pole switch 14 and the conductors 13.

If the inertia of the rotating element of the rotary converter C be insufficient to produce the desired gradual response thereof to changes in torque, a fly wheel 15 may be mounted upon the converter shaft. The field winding $F_C$ of the rotary converter C and the field winding $F_D$ of the dynamo-electric machine D are adapted to be energized by current supplied from the exciter E. The strength and direction of the field $F_D$ are determined by the operation of the controller K in a manner hereinafter described.

The controller K is provided with a pivoted arm 16 carrying relatively insulated contact members 17, 18 and 19. The contact member 17 is adapted, throughout the entire movement of the controller arm 16, to electrically engage with the arc-shaped contact 20, which is electrically connected to one terminal of the field winding $F_C$ by means of a lead 21. Adapted to engage with the movable contact 17 are also provided relatively insulated arc-shaped contacts 22 and 24, the former being in engagement during one portion of the movement of the controller arm and the latter during another portion. Contact 22 is grounded through a resistance 23, and contact 24 is grounded directly.

Engaging with the movable contact 18 throughout the entire range of its movement is an arc-shaped contact 25, one end of which is connected through the lead 26 to the exciter E. Adapted to engage with the contact 18 are arc-shaped contacts 27 and 28, the former being in engagement during one portion of the movement of the contact 18 and the latter during another portion of said movement. The contact 28 is connected through the lead 29 with one terminal of the field $F_D$ of the dynamo-electric machine D. Adapted to engage with the movable contact 19 are arc-shaped contacts 30 and 31, the former being in engagement during one portion of the movement of said contact 19 and the latter during another portion of said movement. The contact 31 is connected to another terminal of the field winding $F_D$ of the dynamo-electric machine D by means of the lead 32. Adapted to engage with the movable contact 19 are also provided segmental contacts 33 and 34. Between the contacts 33 and also between the contacts 34 are interposed suitable resistance sections. The outermost contact 33 and the outermost contact 34 are grounded. Contact 27 is electrically connected to contact 31, and contact 28 is electrically connected to contact 30 at all times. A cam 35 and a spring pressed follower 36 are associated with the controller arm 16 and adapted to prevent the same from remaining in the change over position. Mounted upon the shaft of the controller arm 16 is arranged a gear 37 adapted to coöperate with a rack 38, with one end of which coöperates a dash pot 39.

The portion of the system shown in Fig. 2 differs from the corresponding portion of the system illustrated in Fig. 1 in that compensating windings 41 and 42 are employed in connection with the rotary converter C and the dynamo-electric machine D respectively instead of the squirrel cage windings 6 and 12.

As the mode of operation of both modifications, shown in Figs. 1 and 2, are the same, the method of operating the system will be described with particular reference to Fig. 1. Let it be assumed that the system is operating with the controller arm 16 and the various switches in the positions illustrated. With the controller arm in this position all of the resistance will be eliminated from the circuit of the field winding $F_D$ of the dynamo-electric machine D. The voltage of the direct current machine D will, therefore, have its maximum value and consequently the speed of the converter and the slip frequency of the energy supplied by the induction motor secondary to the alternating current side of the converter will be a maximum. The induction motor I will therefore be operating at the minimum speed. If, now, the controller arm 16 be moved in a clockwise direction, the voltage of the dynamo-electric machine D will be decreased by reason of the insertion, in series with the field $F_D$ of the resistance portions interposed between the segmental contacts 33. As the voltage of the direct current machine D is gradually decreased, the speed of the rotary converter will likewise decrease as will also the slip frequency of the energy transferred from the induction motor secondary to the converter. The speed of the induction motor therefore will increase toward synchronism.

When the controller arm 16 in its clockwise movement passes from the position in which the movable contact 19 engages with the innermost segmental contact 33 to a position where contact 19 engages with the innermost contact 34, the field of the dynamo-electric machine D, and hence the voltage thereof, is reversed and, furthermore, the movable contact 17 passes out of engagement with the contact 22 and into engagement with the contact 24, thereby removing the resistance 23 from the circuit of the field $F_C$ of the rotary converter. The reversal of the voltage of the direct current machine D results, of course, in a reversal of the voltage applied to the direct current side of the converter, and hence develops a torque tending to decelerate the converter. The speed of the converter will then be gradually brought to zero, and subsequently will accelerate in the opposite direction. As the speed of the converter approaches zero, the slip frequency of the induction motor secondary will likewise approach zero, and hence the speed thereof will approach synchronism. When the direction of rotation of the rotary converter reverses, and the speed thereof accelerates from zero, energy with a frequency increasing from zero and with a reversed phase order will be supplied by the converter to the secondary of the induction motor and will cause the speed of said secondary to increase to supersynchronous values. Subsequent movement of the controller arm 16 in a clockwise direction will result in an increase of the direct current voltage applied to the converter and, consequently, an increase in the speed of the converter and in the speed of the induction motor.

I conceive that various modifications of my invention may be made and I accordingly do not desire to be limited to the exact arrangement shown, but seek to cover, in the appended claims, all such modifications and arrangements as fall within the scope and spirit of my invention.

What I claim as new and desire to secure as Letters Patent of the United States, is:

1. The combination, with an induction motor having a phase wound secondary, of means for controlling the speed thereof comprising a rotary converter and an adjustable source of direct current voltage, the alternating current side of the converter being electrically connected to said induction motor secondary and the direct current side of the converter being connected to said direct current source and means for reducing the inductance of the direct current circuit including said direct current source and said rotary converter.

2. The combination, with an induction motor having a phase wound secondary, of means for controlling the speed thereof comprising a rotary converter and a direct current dynamo-electric machine adapted to operate either as a motor or as a generator, the alternating current side of the converter being electrically connected to said induction motor secondary and the direct current side of the converter being electrically connected to said direct current dynamo-electric machine, and means, comprising squirrel cage windings associated with said converter and said direct current dynamo-electric machine, for substantially reducing the inductance of the direct current circuit including said rotary converter and said direct current dynamo-electric machine.

3. The combination, with an induction motor having a phase wound secondary, of means for controlling the speed thereof comprising a rotary converter and a direct current dynamo-electric machine adapted to operate either as a motor or as a generator, the alternating current side of the converter being electrically connected to said induction motor secondary and the direct current side of the converter being electrically connected to said direct current dynamo-electric machine, and means, comprising a squirrel cage winding associated with said dynamo-electric machine, for substantially reducing the inductance of the direct current circuit including said rotary converter and said direct current dynamo-electric machine.

4. The combination, with an induction motor having a phase wound secondary, of means for controlling the speed thereof comprising a rotary converter and a direct current dynamo-electric machine adapted to operate either as a motor or as a generator, the alternating current side of the converter being electrically connected to said induction motor secondary and the direct current side of the converter being electrically connected to said direct current dynamo-electric machine, and means, comprising windings in inductive relation with the armatures of said converter and dynamo-electric machine, for substantially reducing the inductance of the direct current circuit including said rotary converter and said direct current dynamo-electric machine.

5. The combination, with an induction motor having a phase wound secondary, of means for controlling the speed thereof comprising a rotary converter and a direct current dynamo-electric machine adapted to operate either as a motor or as a generator, the alternating current side of the converter being electrically connected to said induction motor secondary and the direct current side of the converter being electrically connected to said direct current dynamo-electric machine, and means, comprising a winding in inductive relation with the armature of said dynamo-electric machine, for substantially reducing the inductance of the direct current circuit including said rotary converter and said direct current dynamo-electric machine.

6. The combination, with an induction motor having a phase wound secondary, of means for controlling the speed thereof comprising a rotary converter and a direct current dynamo-electric machine adapted to operate either as a motor or as a generator, the alternating current side of the converter being electrically connected to said induction motor secondary and the direct current side of the converter, being connected to said direct current dynamo-electric machine, means for substantially reducing the inductance of the direct current circuit including said rotary converter and said direct current dynamo-electric machine, and means for varying the strength of the field of said dynamo-electric machine.

7. The combination with an induction motor having a phase wound secondary, of means for varying the speed thereof comprising a rotary converter, provided with means for causing the speed thereof to respond gradually to changes in torque, a direct current dynamo-electric machine, the alternating current side of said converter being electrically connected to said induction motor secondary and the direct current side of said converter being electrically connected to said dynamo-electric machine, means for substantially reducing the inductance of the direct current circuit including said rotary converter and said dynamo-electric machine, and means for varying the strength of the field of said dynamo-electric machine.

8. The combination, with an induction motor having a phase wound secondary, of means for controlling the speed thereof comprising a rotary converter and a direct current dynamo-electric machine adapted to operate either as a motor or as a generator, the alternating current side of the converter being electrically connected to said induction motor secondary and the direct current side of the converter being electrically connected to said direct current dynamo-electric machine, a source of direct current for separately exciting the fields of the converter and the dynamo-electric machine, means for substantially reducing the inductance of the direct current circuit including said rotary converter and said dynamo-electric machine, and means for varying the strength of the field of said dynamo-electric machine.

9. The combination, with an induction motor having a phase wound secondary, of means for controlling the speed thereof comprising a rotary converter provided with means for causing the speed thereof to respond gradually to changes in torque, and a direct current dynamo-electric machine adapted to operate either as a motor or a generator, the alternating current side of the converter being electrically connected to said induction motor secondary and the direct current side of the converter being electrically connected to said direct current dynamo-electric machine, a source of direct current for separately exciting the fields of the converter and the dynamo-electric machine, means for varying the strength and reversing the direction of the field of the dynamo-electric machine, and means for reducing the inductance of the direct current circuit, including said rotary converter and said direct current dynamo-electric machine, to a low value.

10. The combination with an induction motor having a phase wound secondary of means of varying the speed thereof from sub-synchronous to super-synchronous values comprising a rotary converter, an adjustable and reversible source of direct current voltage, the alternating current side of said converter being electrically connected to said induction motor secondary and the direct current side of said converter being connected to said direct current source, means for reducing the inductance of the direct current circuit including said direct current source and said rotary converter, and means for decreasing the voltage of said source to a low value, reversing said voltage, and then increasing said voltage.

11. The combination with an induction motor having a phase wound secondary of means for varying the speed thereof from sub-synchronous to super-synchronous values comprising a rotary converter, a direct current dynamo-electric machine, the alternating current side of said converter being electrically connected to said induction motor secondary and the direct current side of said converter being connected to said dynamo-electric machine, means for reducing the inductance of the direct current circuit including said dynamo-electric machine and said rotary converter, and means for decreasing the field of said dynamo-electric machine, then simultaneously reversing the direction of the field of said dynamo-electric machine and increasing the field of said converter, and subsequently increasing the field of said dynamo-electric machine.

12. The combination with an induction motor having a phase wound secondary of means for varying the speed thereof from sub-synchronous to super-synchronous values comprising a rotary converter provided with means for causing the speed thereof to respond gradually to changes in torque, a direct current dynamo-electric machine, the alternating current side of said converter being electrically connected to said induction motor secondary and the direct current side of said converter being connected to said dynamo-electric machine, means for reducing the inductance of the direct current circuit including said dynamo-electric machine and said rotary converter, and means for decreasing the field of said dynamo-electric machine, then simultaneously reversing the direction of the field of said dynamo-electric machine and increasing the field of said converter, and subsequently increasing the field of said dynamo-electric machine.

In witness whereof, I have hereunto set my hand this 13th day of March, 1917.

DAVID C. PRINCE.

Copies of this patent may be obtained for five cents each, by addressing the "Commissioner of Patents, Washington, D. C."